J. M. MOORE.
Improvement in Coffee-Cleaning Machines.
No. 129,359.            Patented July 16, 1872.
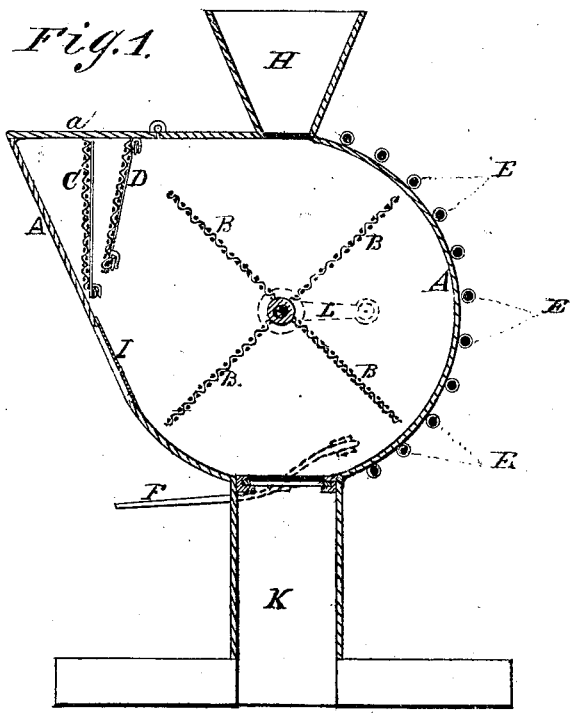
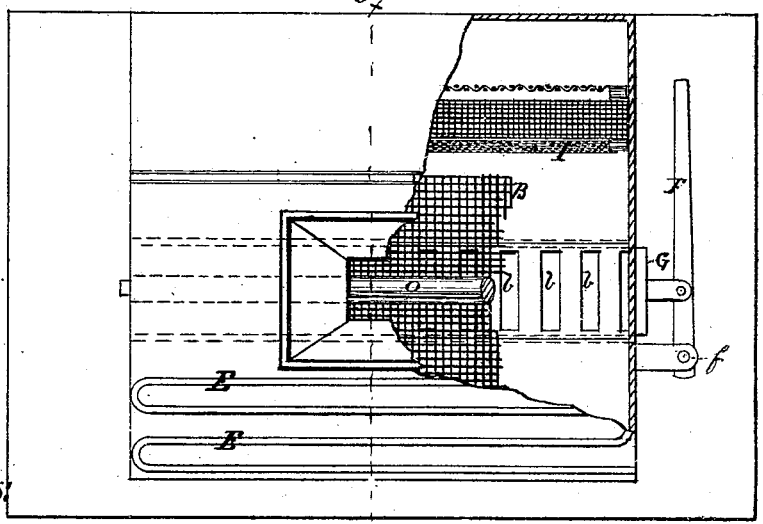
Witnesses:
G. Mathys
Lewis Blackford
Inventor
James M. Moore
by B. F. James,
his Atty.

No. 129,359

UNITED STATES PATENT OFFICE.

JAMES M. MOORE, OF NEW YORK, N. Y.

IMPROVEMENT IN COFFEE-CLEANING MACHINES.

Specification forming part of Letters Patent No. 129,359, dated July 16, 1872.

*To all whom it may concern:*

Be it known that I, JAMES M. MOORE, of the city, county, and State of New York, have invented a new and useful Improvement in Machines for Cleaning Coffee; and I do hereby declare the following to be a full, clear, and exact description of the construction and operation of the same, reference being had to the annexed drawing making part of this my specification.

The nature of my invention consists in the construction of a machine for cleaning coffee, composed of an outer metallic jacket having a shaft running horizontally through its center, to which are attached wire wings or screens, two or more, and which revolve with the shaft. The coffee to be cleaned is poured into the jacket from the top, and falls upon the wire wings or screens aforesaid, while the same have imparted to them a rotary motion. The coffee or other grain to be cleaned is then forced against two other screens, placed vertically, or nearly so, within the rear part of the jacket and near its top, thereby causing all the dirt and scales attached to the coffee to become loosened and detached from the berry or grain, the whole being the result of frictional surfaces with which the material to be cleaned comes in contact. Also, the peculiar method of heating the coffee or material to be cleaned, by the construction and adaptation of a continuous series of coils of pipes arranged upon the external part of the jacket. The heat used may be either steam or hot air. By this mode of construction I avoid the expense of double jackets with inter-spaces, through which heat may be imparted to the coffee or grain to be cleaned, and the liability to injury by reason of the rapid revolution of cylinders within which the cleaning devices may be located.

In the drawing, Figure 1 represents a view in cross-section of the machine taken in line *x x*, Fig. 2. Fig. 2 is a top view, partly cut away to show the interior of the machine and the relation of the several portions of it to each other.

A A is a metallic jacket or case surrounding the screens used, and has upon its upper side the receptacle or hopper H, into which the coffee or grain desired to be cleaned is poured. The screens B B are formed on the shaft O O and rigidly attached to the same, and revolve with it. Said screens are made of wire, of any suitable size, forming a net-work in the same that will not admit of the grain passing through the meshes. The arm or lever L is attached to the shaft O O, and operated by any power that may conveniently be used. As the screens B B revolve the grain is forced upward and upon the supplemental screens D C, that are located or placed in the upper or angular portion of the jacket or case A, and are held in position by hooks fitting upon projections formed within the jacket or case and easily removed. I I are pieces of wire-gauze, placed at intervals within the jacket or case A, occupying nearly its entire length, and located below the screen C. *a* is a lid or door in the top of the jacket or case A, allowing access to the inner side of the same. The jacket or case is heated by means of steam or hot air, conducted through the coiled or continuous pipes E E, &c., arranged upon the external side of the jacket A, as seen in Fig. 1. K is the outlet of the machine. F is a lever, pivoted at *f*, and connected with a sliding bar or valve, G, running the length of the machine at its bottom, which, when moved, opens and closes the spaces *b b b*, &c., that are formed upon the jacket or case A, as seen in Fig. 2. By raising the lid *a*, and by means of the wire-gauze spaces I, the greater portion of the dust or dirt may be expelled from the machine. The heating-pipes E E can be connected with the exhaust-pipe of the engine used for the purpose of propelling the machine, or they may be supplied with heat in any of the ways known for that purpose.

What I claim as my invention, and desire to secure by Letters Patent, is—

1. In combination with the jacket A, the revolving screen-beaters B and supplemental screens C and D, in the manner and for the purpose herein described.

2. In combination with the outer covering or jacket A, the series of coils or pipes E upon the outer side thereof, for heating and drying purposes, in the manner herein set forth.

3. In combination with the revolving screen-beaters B and supplemental screens C and D, the lever F and slide-valve G, in the manner and for the purpose herein described.

JAMES M. MOORE.

Witnesses:
THOMAS J. REILLY,
W. H. MEAD.